(12) United States Patent
Chen et al.

(10) Patent No.: US 9,897,745 B2
(45) Date of Patent: Feb. 20, 2018

(54) OPTICAL MODULE, DISPLAY DEVICE CONTAINING THE SAME AND METHOD FOR MANUFACTURING THE SAME

(71) Applicant: E Ink Holdings Inc., Hsinchu (TW)

(72) Inventors: I-Jeng Chen, Hsinchu (TW); Sheng-Chieh Tai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 19 days.

(21) Appl. No.: 14/617,947

(22) Filed: Feb. 10, 2015

(65) Prior Publication Data

US 2015/0346426 A1    Dec. 3, 2015

(30) Foreign Application Priority Data

May 29, 2014  (TW) ............... 103118829 A

(51) Int. Cl.
 *F21V 8/00* (2006.01)
(52) U.S. Cl.
 CPC ........... *G02B 6/0065* (2013.01); *G02B 6/002* (2013.01); *G02B 6/006* (2013.01); *G02B 6/0028* (2013.01); *G02B 6/0063* (2013.01)
(58) Field of Classification Search
 CPC ............... G02B 6/0011; G02B 6/0058; G02F 1/133615; G02F 1/133616; G09F 13/0413
 USPC ........................................ 349/63; 445/23, 24
 See application file for complete search history.

(56) References Cited

U.S. PATENT DOCUMENTS

| | | | | |
|---|---|---|---|---|
| 4,714,983 A * | 12/1987 | Lang | ................ | G02B 6/0021 349/65 |
| 6,412,969 B1 * | 7/2002 | Torihara | ................ | G02B 6/0021 349/62 |
| 6,910,783 B2 * | 6/2005 | Mezei | ................ | G02B 6/001 362/23.09 |
| 2004/0004827 A1 * | 1/2004 | Guest | ................ | G02B 6/0091 362/612 |
| 2004/0257484 A1 * | 12/2004 | Ishitaka | ................ | G02B 1/11 349/16 |

(Continued)

FOREIGN PATENT DOCUMENTS

| CN | 102621716 A | 8/2012 |
|---|---|---|
| CN | 102622940 A | 8/2012 |

(Continued)

OTHER PUBLICATIONS

Corresponding Taiwanese Office Action that these art references dated Mar. 31, 2016.

(Continued)

*Primary Examiner* — Alexander Garlen
*Assistant Examiner* — Eric T Eide
(74) *Attorney, Agent, or Firm* — CKC & Partners Co., Ltd.

(57) ABSTRACT

The present disclosure provides an optical module. The optical module includes a light guide plate and a decorative layer. The light guide plate includes at least one light-entering inclined surface, a first light-emitting inclined surface adjacent to the light-entering inclined surface and a second light-emitting inclined surface opposite to the first light-emitting inclined surface. The decorative layer is covered the second light-emitting inclined surface of the light guide plate by an injection molding process. A display device containing the optical module and a method for manufacturing the optical module are also provided herein.

8 Claims, 3 Drawing Sheets

(56) References Cited

U.S. PATENT DOCUMENTS

| | | | |
|---|---|---|---|
| 2008/0068858 A1* | 3/2008 | Yamamoto | G02B 6/0033 362/606 |
| 2008/0278658 A1 | 11/2008 | Kim et al. | |
| 2008/0285274 A1* | 11/2008 | Jung | F21S 8/032 362/240 |
| 2009/0034295 A1 | 2/2009 | Song et al. | |
| 2010/0135038 A1 | 6/2010 | Handschy et al. | |
| 2012/0212928 A1* | 8/2012 | Lee | G02F 1/1333 362/19 |
| 2012/0281430 A1 | 11/2012 | Huang et al. | |
| 2013/0063969 A1 | 3/2013 | Neugebauer et al. | |
| 2013/0141651 A1* | 6/2013 | Kuromizu | G02B 6/0088 348/739 |
| 2013/0201719 A1 | 8/2013 | Kuo | |
| 2013/0258426 A1* | 10/2013 | Tsumekawa | G02B 6/0031 358/475 |
| 2014/0049723 A1* | 2/2014 | Ryu | G02F 1/133606 349/62 |
| 2014/0300845 A1* | 10/2014 | Tamaki | G02F 1/133514 349/65 |

FOREIGN PATENT DOCUMENTS

| | | |
|---|---|---|
| CN | 203276214 U | 11/2013 |
| TW | 442674 B | 6/2001 |
| TW | 201310094 A1 | 3/2013 |
| TW | M452347 U1 | 5/2013 |

OTHER PUBLICATIONS

Corresponding Chinese Office Action that these art references dated Mar. 8, 2017.

* cited by examiner

OPTICAL MODULE, DISPLAY DEVICE CONTAINING THE SAME AND METHOD FOR MANUFACTURING THE SAME

RELATED APPLICATIONS

This application claims priority to Taiwanese Application Serial Number 103118829 filed May 29, 2014, which is herein incorporated by reference.

BACKGROUND

Technical Field

The present disclosure relates to an optical module, and more particularly, to an optical module made by an injection molding process.

Description of Related Art

In a display device, an optical module is usually formed by adhering a light guide plate and a cover lens by an adhesive. In the adhesion process, the adhesive, a surface of the light guide plate, or a surface of the cover lens may be attached with contamination particles, such as dust or the like. The contamination particles may form obvious dark points on a display surface of the display device, and even cause the detaching of the adhesive interface between the light guide plate and the cover lens in the optical module, so as to decrease the reliability of the display device.

Therefore, there is a need for an improved optical module and method for manufacturing thereof to solve the aforementioned problems met in the art.

SUMMARY

The present disclosure provides an optical module and a method for manufacturing thereof, so as to solve the aforementioned problems met in the art, and increase the reliability of a display device.

One embodiment of the present disclosure is to provide an optical device. The optical module includes a light guide plate and a decoration layer. The light guide plate includes at least one light-entering surface, a first light-extracting surface adjacent to the light-entering surface and a second light-extracting surface opposite to the first light-extracting surface. The decoration layer covers the second light-extracting surface of the light guide plate by an injection molding process.

According to one embodiment of the present disclosure, the light guide plate further includes a flange extended from an upper sidewall of the light-entering surface.

According to one embodiment of the present disclosure, the flange is bended toward the first light-extracting surface.

According to one embodiment of the present disclosure, the flange and the light-entering surface form a housing space, and the housing space is adjacent to the light-entering surface.

According to one embodiment of the present disclosure, a material of the light guide plate includes polycarbonate (PC), polymethyl methacrylate (PMMA) or a combination thereof.

According to one embodiment of the present disclosure, a thickness of the light guide plate is in a range of 500-1,500 μm.

According to one embodiment of the present disclosure, the first light-extracting surface of the light guide plate further includes an optical microstructure.

According to one embodiment of the present disclosure, a material of the decoration layer includes a polyester plastic.

According to one embodiment of the present disclosure, the polyester plastic includes polycarbonate (PC), polymethyl methacrylate (PMMA), polyethylene terephthalate (PET) or a combination thereof.

According to one embodiment of the present disclosure, the material of the decoration layer is the same as or different from that of the light guide plate.

According to one embodiment of the present disclosure, a thickness of the decoration layer is in a range of 100-300 μm.

According to one embodiment of the present disclosure, a thickness ratio of the decoration layer to the light guide plate is in a range of 0.06-0.6.

According to one embodiment of the present disclosure, the decoration layer includes a light-transmitting portion and a light-blocking portion adjacent to the light-transmitting portion.

According to one embodiment of the present disclosure, the light-transmitting portion is arranged at a center position of the decoration layer, and the light-blocking portion surrounds the light-transmitting portion.

According to one embodiment of the present disclosure, the light-blocking portion further includes at least one pigment.

According to one embodiment of the present disclosure, the injection molding process includes an in-mold decoration process, an in-mold forming process, an out-side mold decoration process or a combination thereof.

Another embodiment of the present disclosure is to provide a display device. The display device includes a light source module and a display unit. The light source module includes the optical module as mentioned above and at least one light source positioned to emit light toward the light-entering surface. The display unit is positioned on the side of the first light-extracting surface of the light guide plate of the optical module, and the first light-extracting surface of the light guide plate is between the second light-extracting surface and the display unit.

According to one embodiment of the present disclosure, the display unit is a reflective display unit.

Further another embodiment of the present disclosure is to provide a method for manufacturing an optical module. The method includes the following steps. A light guide plate is provided. The light guide plate has a light-entering surface, a first light-extracting surface adjacent to the light-entering surface and a second light-extracting surface opposite to the first light-extracting surface. An injection molding process is performed to form a decoration layer on the second light-extracting surface of the light guide plate.

According to one embodiment of the present disclosure, the method further includes forming an optical microstructure on the first light-extracting surface.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
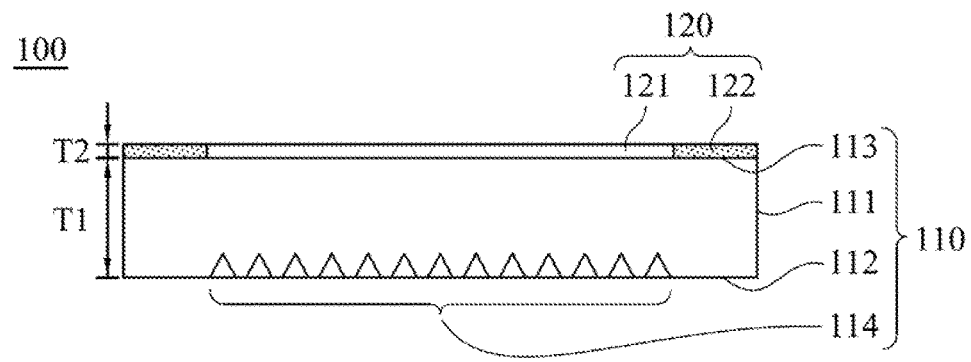
FIG. 1 is a schematic cross-sectional view of an optical module 100 according to one embodiment of the present disclosure.

The embodiments of the transparent heat-conducting structure and a method for manufacturing the same of the present disclosure are discussed in detail below, but not limited the scope of the present disclosure. The same symbols or numbers are used to the same or similar portion in the drawings or the description. And the applications of the present disclosure are not limited by the following embodiments and examples which the person in the art can apply in the related field.

The singular forms "a," "an" and "the" used herein include plural referents unless the context clearly dictates otherwise. Therefore, reference to, for example, a metal layer includes embodiments having two or more such metal layers, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

In a conventional optical module, an adhesive is used to adhesive a light guide plate and a cover lens. In the adhesion process, contamination particles, such as dust or the like, may be attached to the adhesive, a surface of the light guide plate, or a surface of the cover lens. A decoration layer in some embodiments of the present disclosure is formed on a light guide plate by an injection molding process, so as to solve the aforementioned problems met in the art.

Because of an evacuation step of a mold in the injection molding process, most dust may be removed by the evacuation step, so that the contamination particles, such as dust or the like, adsorbed on the adhesive is significantly decreased. In addition, by the injection molding process, the decoration layer formed on the light guide plate may solve the problem of the decoration layer peered form the light guide layer by an adhesion.

Referring to FIG. 1. FIG. 1 is a schematic cross-sectional view of an optical module 100 according to one embodiment of the present disclosure. In FIG. 1, the optical module 100 includes a light guide plate 110 and a decoration layer 120.

The light guide plate 110 includes at least one light-entering surface 111, a first light-extracting surface 112 adjacent to the light-entering surface 111 and a second light-extracting surface 113 opposite to the first light-extracting surface 112. According to one embodiment of the present disclosure, a material of the light guide plate 110 includes polycarbonate (PC), polymethyl methacrylate (PMMA) or a combination thereof. According to one embodiment of the present disclosure, a thickness (T1) of the light guide plate 110 is in a range of 500-1,500 μm. According to one embodiment of the present disclosure, the first light-extracting surface 112 of the light guide plate 110 further includes an optical microstructure 114.

The decoration layer 120 covers the second light-extracting surface 113 of the light guide plate 110 by an injection molding process. According to one embodiment of the present disclosure, the injection molding process includes an in-mold decoration process, an in-mold forming process, an out-side mold decoration process or a combination thereof. According to one embodiment of the present disclosure, a material of the decoration layer 120 includes a polyester plastic. According to one embodiment of the present disclosure, the polyester plastic includes polycarbonate (PC), polymethyl methacrylate (PMMA), polyethylene terephthalate (PET) or a combination thereof. According to one embodiment of the present disclosure, the material of the decoration layer 120 is the same as or different from that of the light guide plate 110. According to one embodiment of the present disclosure, a thickness (T2) of the decoration layer 120 is in a range of 100-300 μm. According to one embodiment of the present disclosure, a thickness ratio (T2/T1) of the decoration layer 120 to the light guide plate 110 is in a range of 0.06-0.6.

In FIG. 1, the decoration layer 120 of the optical module 100 includes a light-transmitting portion 121 and a light-blocking portion 122 adjacent to the light-transmitting portion 121. According to one embodiment of the present disclosure, the light-transmitting portion 121 is arranged at a center position of the decoration layer 120, and the light-blocking portion 122 surrounds the light-transmitting portion 121. According to one embodiment of the present disclosure, the light-blocking portion 122 further includes at least one pigment.

Figure 2:
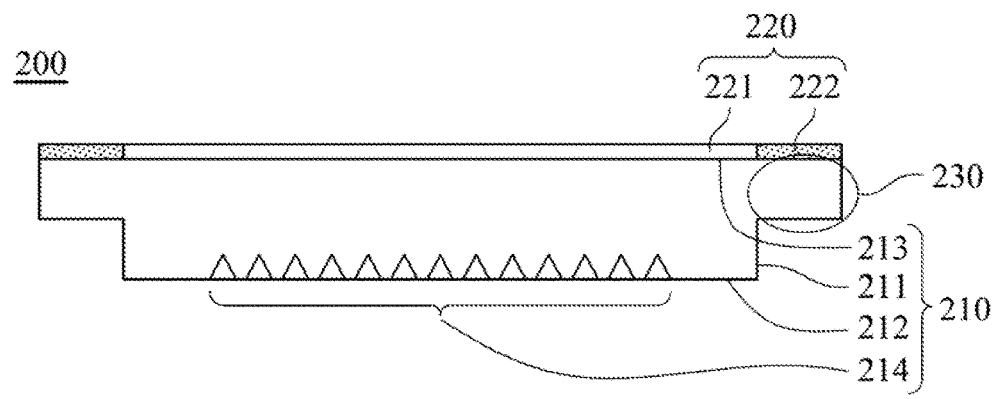
FIG. 2 is a schematic cross-sectional view of an optical module 200 according to one embodiment of the present disclosure.

FIG. 2 is a schematic cross-sectional view of an optical module 200 according to one embodiment of the present disclosure. In FIG. 2, the optical module 200 includes a light guide plate 210 and a decoration layer 220.

The light guide plate 210 includes at least one light-entering surface 211, a first light-extracting surface 212 adjacent to the light-entering surface 211 and a second light-extracting surface 213 opposite to the first light-extracting surface 212. The first light-extracting surface 212 of the light guide plate 210 further includes an optical microstructure 214. Different from the optical module 100 in FIG. 1, the light guide plate 210 of the optical module 200 further includes a flange 230 extended from an upper sidewall of the light-entering surface 211.

The decoration layer 220 covers the second light-extracting surface 213 of the light guide plate 210 by an injection molding process. The decoration layer 220 includes a light-transmitting portion 221 and a light-blocking portion 222 adjacent to the light-transmitting portion 221.

Figure 3:
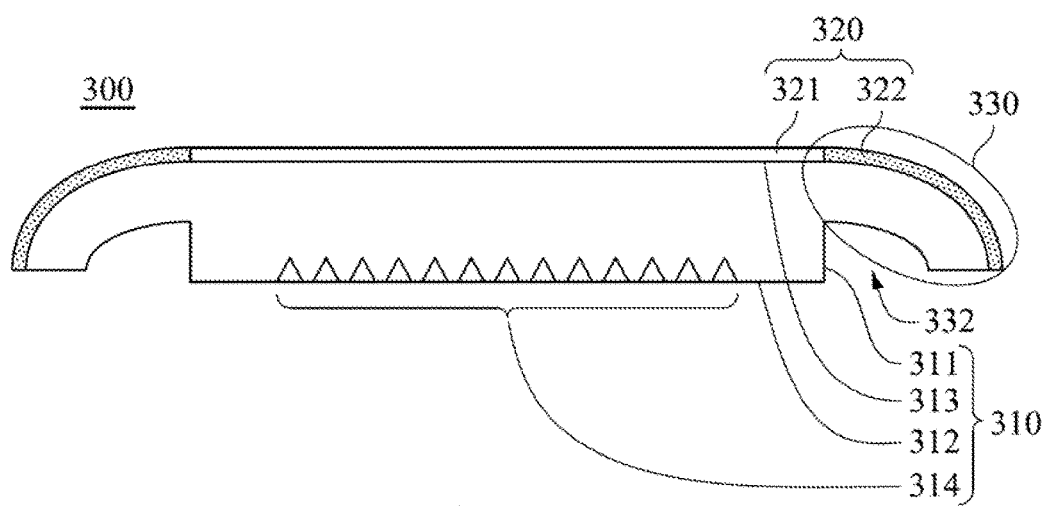
FIG. 3 is a schematic cross-sectional view of an optical module 300 according to one embodiment of the present disclosure.

FIG. 3 is a schematic cross-sectional view of an optical module 300 according to one embodiment of the present disclosure. In FIG. 3, the optical module 300 includes a light guide plate 310 and a decoration layer 320.

The light guide plate 310 includes at least one light-entering surface 311, a first light-extracting surface 312 adjacent to the light-entering surface 311 and a second light-extracting surface 313 opposite to the first light-extracting surface 312. The first light-extracting surface 312 of the light guide plate 310 further includes an optical microstructure 314. Different from the flange 230 the optical module 200 in FIG. 2, a flange 330 of the light guide plate 310 in the optical module 300 is bended toward the first light-extracting surface 312. According to one embodiment of the present disclosure, the flange 330 and the light-entering surface 311 form a housing space 332, and the housing space 332 is adjacent to the light-entering surface 311. According to one embodiment of the present disclosure, the flange 330 is bended toward a top side of the second light-extracting surface 313.

The decoration layer 320 covers the second light-extracting surface 313 of the light guide plate 310 by an injection molding process. The decoration layer 320 includes a light-transmitting portion 321 and a light-blocking portion 322 adjacent to the light-transmitting portion 321.

Figure 4:
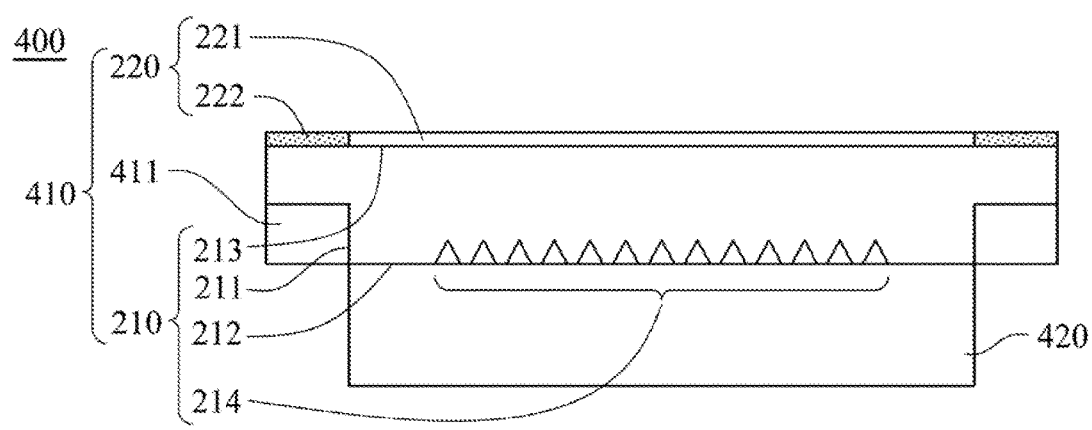
FIG. 4 is a schematic cross-sectional view of a display device 400 according to one embodiment of the present disclosure.

FIG. 4 is a schematic cross-sectional view of a display device 400 according to one embodiment of the present disclosure. In FIG. 4, the display device 400 includes a light source module 410 and a display unit 420. The light source module 410 includes the optical module 200 as shown in FIG. 2 and at least one light source 411 positioned to emit light toward the light-entering surface 211. The display unit 420 is positioned on the side of the first light-extracting surface 212 of the light guide plate 210 of the light source module 410, and the first light-extracting surface 212 of the light guide plate 210 is between the second light-extracting surface 213 and the display unit 420. According to one embodiment of the present disclosure, the light source 411 is a light-emitting diode (LED). According to one embodiment of the present disclosure, the display unit 420 is a reflective display unit.

Figure 5A:
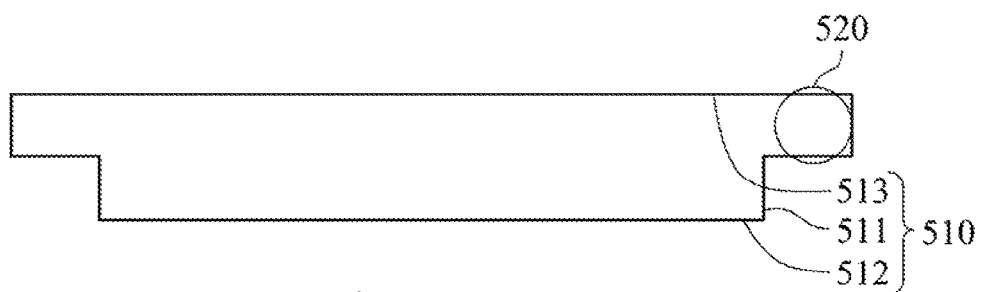
FIGS. 5A-5B are schematic cross-sectional views of various stages of manufacturing an optical module 500 according to one embodiment of the present disclosure.
Figure 5B:
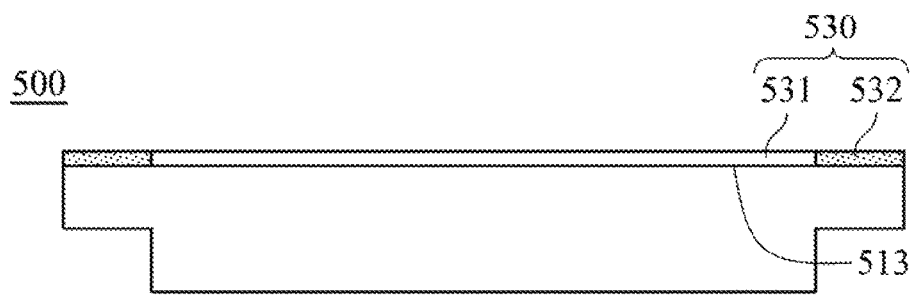

FIGS. 5A-5B are schematic cross-sectional views of various stages of manufacturing an optical module 500 according to one embodiment of the present disclosure. In FIG. 5A, a light guide plate 510 is provided. The light guide plate 510 has a light-entering surface 511, a first light-extracting surface 512 adjacent to the light-entering surface 511 and a second light-extracting surface 513 opposite to the first light-extracting surface 512. The light guide plate 510 further includes a flange 520 extended from an upper sidewall of the light-entering surface 511.

In FIG. 5B, an injection molding process is performed to form a decoration layer 530 on the second light-extracting surface 513 of the light guide plate 510. According to one embodiment of the present disclosure, the injection molding process includes an in-mold decoration process, an in-mold forming process, an out-side mold decoration process or a combination thereof. The decoration layer 530 includes a light-transmitting portion 531 and a light-blocking portion 532 adjacent to the light-transmitting portion 531. According to one embodiment of the present disclosure, the light-transmitting portion 531 is arranged at a center position of the decoration layer 530, and the light-blocking portion 532 surrounds the light-transmitting portion 531.

Figure 6:
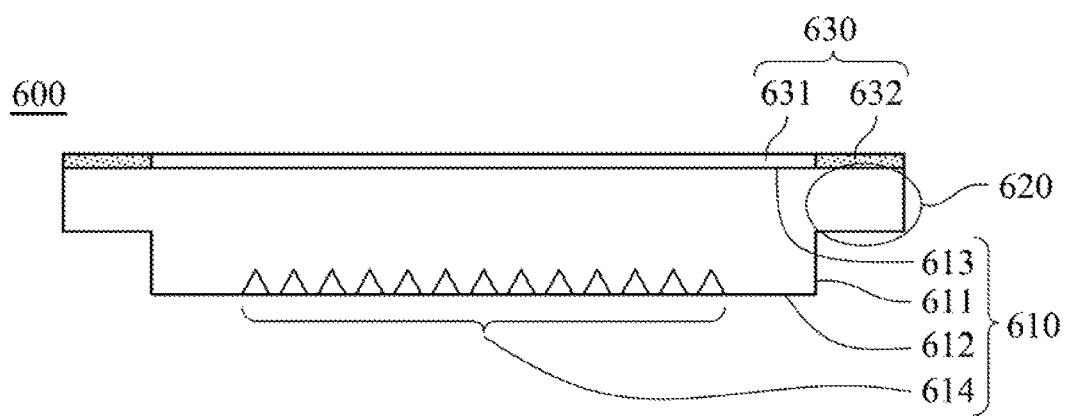
FIG. 6 is a schematic cross-sectional view of a stage of manufacturing an optical module 600 according to one embodiment of the present disclosure.

FIG. 6 is a schematic cross-sectional view of a stage of manufacturing an optical module 600 according to one embodiment of the present disclosure. In FIG. 6, a light guide plate 610 is provided. The light guide plate 610 has a light-entering surface 611, a first light-extracting surface 612 adjacent to the light-entering surface 611 and a second light-extracting surface 613 opposite to the first light-extracting surface 612. The light guide plate 610 further includes a flange 620 extended from an upper sidewall of the light-entering surface 611. An injection molding process is performed to form a decoration layer 630 on the second light-extracting surface 613 of the light guide plate 610. The decoration layer 630 includes a light-transmitting portion 631 and a light-blocking portion 632 adjacent to the light-transmitting portion 631. In FIG. 6, the manufacturing method of the optical module 600 further includes forming an optical microstructure 614 on the first light-extracting surface 612.

In some embodiments of the present disclosure, the decoration layer formed on the light guide plate by the injection molding process may decrease contamination particles, such as dust or the like, attached to a surface of the light guide plate, and may solve the problem of the detaching of the adhesive interface between the light guide plate and the cover lens, so as to increase the reliability of the display device.

Although embodiments of the present disclosure and their advantages have been described in detail, they are not used to limit the present disclosure. It should be understood that various changes, substitutions and alterations can be made herein without departing from the spirit and scope of the present disclosure. Therefore, the protecting scope of the present disclosure should be defined as the following claims.

What is claimed is:

1. A method for manufacturing an optical module, comprising:
   providing a light guide plate, the light guide plate having a light-entering surface, a first light-extracting surface adjacent to the light-entering surface and a second light-extracting surface opposite to the first light-extracting surface;
   forming an optical microstructure on the first light-extracting surface; and
   performing an injection molding process to form a decoration layer on the second light-extracting surface of the light guide plate, wherein the decoration layer comprises a light-transmitting element and a light-blocking portion that are coplanar and are fabricated by the same injection molding process, and the light-blocking portion surrounds the light-transmitting element and is physically connected to the light-transmitting element, and an orthogonal projection of the light-blocking portion on the first light-extracting surface does not overlap the optical microstructure; the light-transmitting element and the light-blocking portion respectively cover a center area and an edge area of the second light-extracting surface of the light guide plate.

2. The method for manufacturing the optical module of claim 1, wherein a material of the light guide plate comprising polycarbonate (PC), polymethyl methacrylate (PMMA) or a combination thereof.

3. The method for manufacturing the optical module of claim 1, wherein a thickness of the light guide plate is in a range of 500-1,500 μm.

4. The method for manufacturing the optical module of claim 1, wherein a material of the decoration layer comprises a polyester plastic.

5. The method for manufacturing the optical module of claim 4, wherein the polyester plastic consists of polycarbonate (PC), polymethyl methacrylate (PMMA), polyethylene terephthalate (PET) or a combination thereof.

6. The method for manufacturing the optical module of claim 1, wherein a thickness of the decoration layer is in a range of 100-300 μm.

7. The method for manufacturing the optical module of claim 1, wherein a thickness ratio of the decoration layer to the light guide plate is in a range of 0.06-0.6.

8. The method for manufacturing the optical module of claim 1, wherein the injection molding process comprises an in-mold decoration process, an in-mold forming process, an out-side mold decoration process or a combination thereof.

* * * * *